(12) United States Patent
Luebke et al.

(10) Patent No.: US 6,504,112 B1
(45) Date of Patent: Jan. 7, 2003

(54) ANALYTICAL BALANCE WITH WIND GUARD

(75) Inventors: Eberhard Luebke, Hardegsen (DE); Hans-Heinrich Koehne, Goettingen (DE); Juergen Winkelbach, Friedland (DE)

(73) Assignee: Sartorius Aktiengesellschaft, Goettingen (DE)

( * ) Notice: Subject to any disclaimer, the term of this patent is extended or adjusted under 35 U.S.C. 154(b) by 143 days.

(21) Appl. No.: 09/715,168

(22) Filed: Nov. 20, 2000

(30) Foreign Application Priority Data

Nov. 19, 1999 (DE) .......................................... 199 61 748

(51) Int. Cl.[7] .............................................. G01G 21/28
(52) U.S. Cl. ...................... 177/180; 177/181; 312/25; 312/29; 49/409
(58) Field of Search ................................ 177/180, 181, 177/238; 312/350, 25, 28, 29, 131, 132, 138.1, 139.2, 334.1; 49/409, 410, 413, 428, 431, 440, 442

(56) References Cited

U.S. PATENT DOCUMENTS

| | | | |
|---|---|---|---|
| 3,775,905 A | * 12/1973 | Frank | 49/153 |
| 4,664,207 A | 5/1987 | Knothe et al. | 177/181 |
| 4,666,005 A | * 5/1987 | Komoto et al. | 177/180 |
| 4,700,793 A | 10/1987 | Luechinger | 177/181 |
| 5,058,692 A | * 10/1991 | Melcher et al. | 177/181 |
| 5,072,838 A | * 12/1991 | Price, Jr. et al. | 312/198 |
| 5,170,855 A | * 12/1992 | Kunz et al. | 177/181 |
| 5,647,094 A | * 7/1997 | Mariel | 49/351 |
| 5,771,534 A | * 6/1998 | Church | 49/375 |
| 5,874,694 A | * 2/1999 | Ruedisueli | 177/180 |
| 6,148,451 A | * 11/2000 | Debraal et al. | 49/410 |

FOREIGN PATENT DOCUMENTS

DE  3936583 A1 * 8/1991 ................. 49/409

* cited by examiner

*Primary Examiner*—Randy W. Gibson
(74) *Attorney, Agent, or Firm*—Sughrue Mion, PLLC

(57) ABSTRACT

An analytical balance includes a balance housing having a base area and back structure, a balance scale, and a wind guard encircling the balance scale. The wind guard includes a base surface formed by the base area, a back wall formed by the back structure, a fixed front pane, movable side panes, and a movable upper sliding door. The side panes and the upper sliding door can be opened or closed manually or by motor. The fixed front pane has no frame and is fastened to the base area. The side panes are guided on the base area and are secured on the back structure, to prevent tilting. The upper sliding door is guided by at least one sliding guide on the back structure. This configuration provides an open view of the goods being weighed that is essentially unobstructed from all sides, as well as ready access thereto.

24 Claims, 2 Drawing Sheets

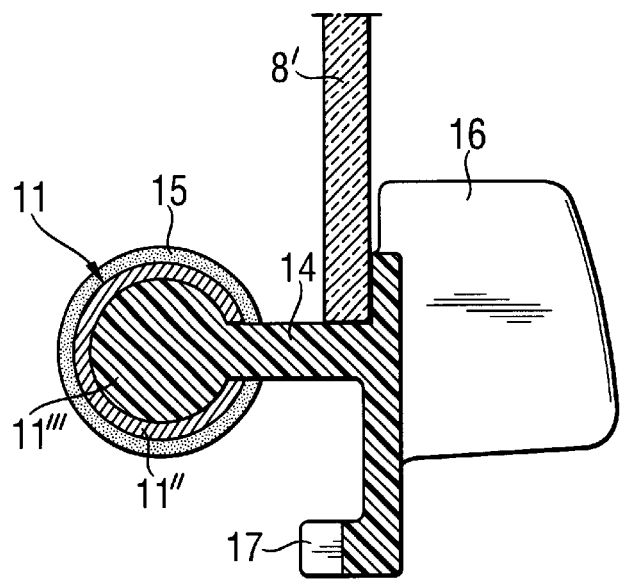
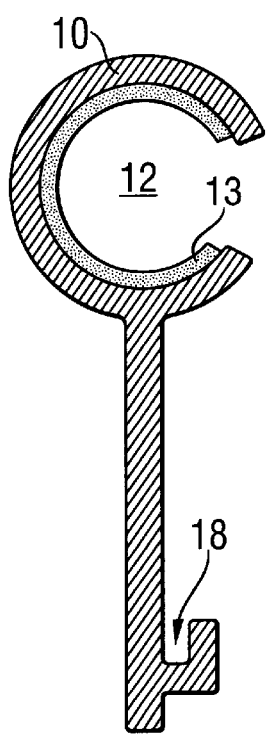
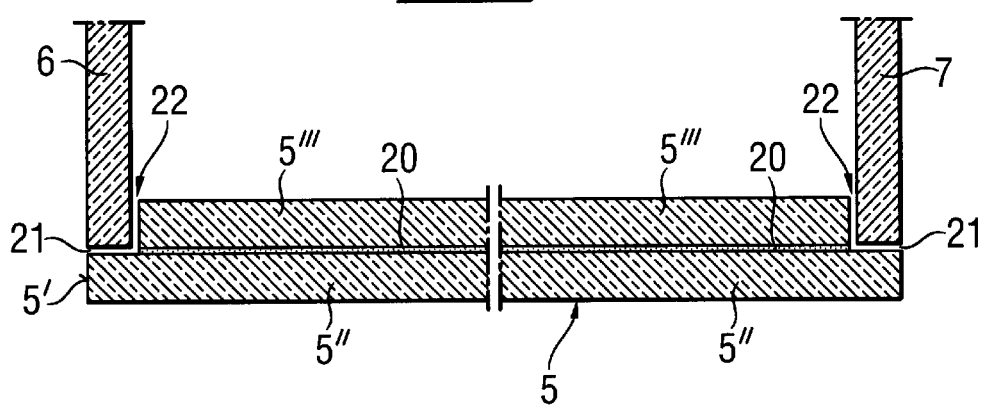

ND AL BALANCE WITH WIND
GUARD

This is a U.S. Couterpart of German Patent Application DE 199 61 748.1, with a foreign filing date of Nov. 19, 1999, the disclosure of which is incorporated into this application by reference.

FIELD AND BACKGROUND OF THE INVENTION

The invention relates to an analytical balance having a balance housing, which includes a base area and a back structure, and a balance scale. The analytical balance further includes a wind guard that encircles the balance scale and that has a base surface formed by the base area of the balance housing and a back wall formed by the back structure of the balance housing. The analytical balance further includes a fixed front pane, two movable side panes, and a movable upper sliding door. Moreover, the movable wall elements can be opened and closed by hand or by motor.

Balances of this type are generally known and are described in U.S. Pat. No. 4,664,207 (corresponding to Laid Open German Application DE 35 08 873 C1) or U.S. Pat. No. 4,700,793 (corresponding to EP 234 008 B1), for example.

In U.S. Pat. No. 4,664,207, a frameless front pane is fastened to a base area of a balance housing and, in addition, is held at its upper end by two guide rails. The frameless front pane is connected to a back structure of the balance housing. The two guide rails serve simultaneously as guides for the upper sliding door and for the side panes. This provides a very simple configuration for guiding an upper sliding door, as well as providing stability for the front pane. Furthermore, the view of the goods being weighed is essentially unobstructed from both the front and the sides, and the fixed guide rails only obstruct the view and access from obliquely above.

In U.S. Pat. No. 4,700,793, the accessibility and the view from obliquely above are unobstructed because the guide parts that connect the sliding side panes to the upper sliding door are slidable into or over the back structure of the balance housing. However, this configuration is quite complicated. Furthermore, the displacement of the guide parts results in the incomplete guiding of the side panes at the back of the analytical balance over their entire area, when the upper sliding door is open. In contrast, the side panes are guided along their entire length when the upper sliding doors are closed.

Conversely, if both sliding side panes are open, the guide parts of the upper sliding door lack support. Thus, this arrangement suffers from the problem that the guide parts sink forward somewhat, due to insufficient rigidity, and the side doors are difficult to access. Also, the upper sliding door is relatively difficult to access because both the friction of the entrained guide parts and the friction between the guide parts and the side panes must be overcome. Furthermore, in U.S. Pat. No. 4,700,793, the lateral view from the front is obstructed by an encircling frame around the front pane.

OBJECTS OF THE INVENTION

According to one objective of the present invention, it is sought to combine the advantages of the two specified types of construction, while avoiding the disadvantages thereof. In particular, the side panes and the upper sliding door should be moveable without affecting one another. In addition, the view of the goods being weighed should be unobstructed from the front and the side, as well as from above and obliquely above. Moreover, access to the goods to be weighed, both from above and from the sides, should also be unobstructed.

SUMMARY OF THE INVENTION

These and other objectives are achieved by providing an analytical balance including a balance housing having a base area and a back structure, a balance scale, and a wind guard encircling the balance scale. The wind guard includes a base surface formed by the base area and a back wall formed by the back structure. The wind guard further includes a fixed front pane, a right and a left movable side pane, and a movable upper sliding door.

The fixed front pane is implemented without a frame and is fastened to the base area of the balance housing. Preferably, the front pane is fastened only on the base area. The right and left side panes are guided on the base area and are secured on the back structure. Preferably, the side panes are secured at the back structure only against tilting. The upper sliding door is guided by at least one sliding guide on the back structure of the balance housing.

BRIEF DESCRIPTION OF THE DRAWINGS

The invention and advantageous refinements thereof are explained in more detail below with the aid of diagrammatic, exemplary embodiments in the drawing, in which:

FIG. 2 shows a vertical cross-section through an affixed part of a round bar sliding guide, the affixed part being fastened to a balance housing of the analytical balance of FIG. 1;

FIG. 3 shows a vertical cross-section through a movable part of the round bar sliding guide; and FIG. 4 shows a horizontal section through an exemplary embodiment of the front pane.

DETAILED DESCRIPTION OF THE PREFERRED EMBODIMENTS

Figure 1:
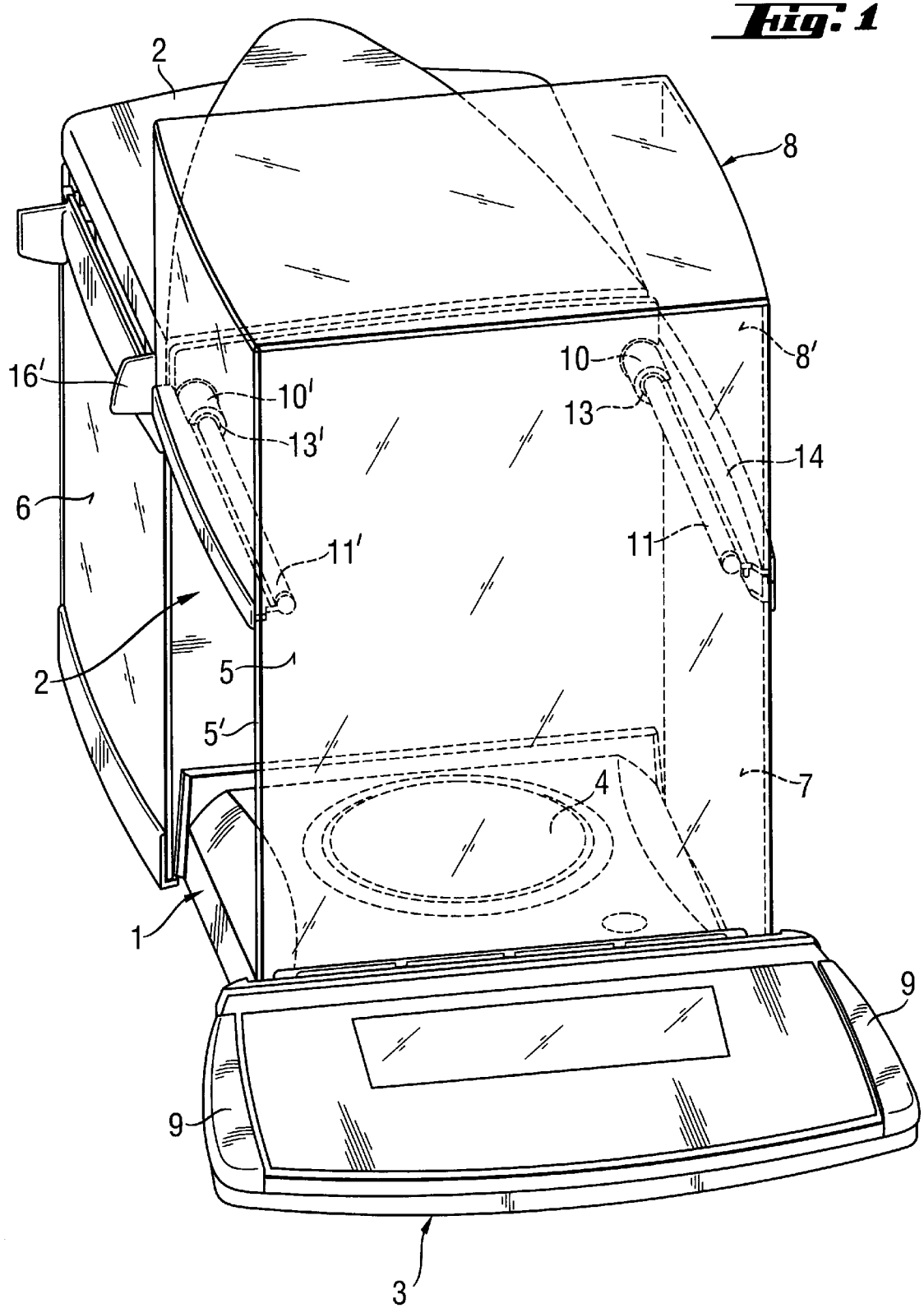
FIG. 1 shows a perspective view of the analytical balance, according to an embodiment of the invention.

FIG. 1 shows an analytical balance, in perspective view, according to an embodiment of the present invention. The analytical balance includes a base area 1 of the housing, a back structure 2 of the housing, a display and control part 3 affixed to the housing, a balance scale 4, and a wind guard which encircles the balance scale on all sides. The base of the wind guard is formed by the base area 1 of the housing. The back wall of the wind guard is formed by the back structure 2 of the housing. The front of the wind guard is formed by a stable, fixed, transparent front pane 5, which is further indicated in FIG. 1 by its lateral edge 5'. The two side doors 6 and 7 form the sides of the wind guard. The left side door 6 is shown in an open position. The upper movable sliding door 8 defines the upper enclosing portion of the wind guard. The exemplary upper movable sliding door 8 illustrated in FIG. 1 is shaped like an upper lid of a case.

A guide for the upper sliding door 8 can be seen partially in FIG. 1. In order to explain the guide's function, FIG. 2 shows a vertical cross-section through an affixed part 10 of the guide that is fastened to the balance housing. In addition, a vertical cross-section through a movable round bar 11 of the guide is shown in FIG. 3.

The affixed part 10 of a round bar sliding guide, C-shaped in cross-section, is fastened to the balance housing and defines a cylindrical interior space (hollow space) 12. A C-shaped plastic sliding liner 13 is attached along a front end of the interior space 12, as shown in FIG. 1. This sliding liner 13 permits sliding movement of the round bar 11. For the sake of clarity, the round bar 11 is left out of FIG. 2 and is illustrated separately in FIG. 3.

As shown in FIG. 3, the round bar 11 transitions laterally into a stay 14, to which the lateral area 8' of the upper sliding door 8 is fastened. At the back end of the round bar 11, which is hidden in FIG. 1 within the back structure 2 of the balance housing, a sliding cover 15 is fixedly connected to the round bar 11. In the closed position of the upper sliding door 8 depicted in FIG. 1, the sliding cover 15 is located just behind the sliding liner 13 of the affixed part 10 that is fastened to the balance housing. On opening the upper sliding door 8, the sliding cover 15 moves with the round bar 11, and the distance between the sliding liner 13 and cover 15 increases. Thereby, the load on the sliding liner and cover decreases. Advantageously, the round bar sliding guide of the present invention has low space requirements and uses parts that can be produced simply.

The movable round bar 11 advantageously includes an outer, slotted metal pipe 11" and an inner plastic core 11'''. The plastic core 11''' leads into the lateral stay 14, which also is formed of plastic. During assembly, the slotted metal pipe 11" is simply slid onto the plastic core 11'''. The metal pipe 11" can be formed of steel or aluminum, for example. The aluminum embodiment can, for example, be produced by an extrusion process. The desired surface hardness and sliding characteristics are then achieved, for this exemplary embodiment, by a special surface heat treatment.

FIG. 3 also depicts a sliding side door handle 16, which allows a user to move the upper sliding door 8 by hand. In FIG. 1 only the sliding door handle 16' on the opposite left side of the upper sliding door 8 can be seen. The sliding door handle 16' is connected to the movable part 11' of the left round bar sliding guide.

In addition, FIG. 3 shows a rack 17 that is connected to the movable round bar 11 of the round bar sliding guide. The rack 17 engages with a pinion of an electric motor that is housed in the back structure 2 of the balance housing, thereby permitting motorized movement of the upper sliding door. For example, one of the operator keys 9 on the display and control part 3 can be used to control the motor.

Tolerances between the right round bar sliding guide 10/11 and the movable bar 11' of the left round bar sliding guide are compensated by the elasticity of the sliding door 8, especially by its case-like form. However, it is also possible to replace the two round bar sliding guides with a single guide that is positioned, by way of example, on the right side. In this alternative embodiment, the sliding door 8 can be supported on the other side, for example, by the two overlaid surfaces sliding on one another.

The guiding of the two side panes 6 and 7 on the base area 1 of the housing is of the conventional type and thus is not represented and explained in more detail here. U.S. Pat. No. 4,664,207, cited and discussed above, describes in detail one possible construction of the guidance of the side panes 6 and 7.

In order to prevent the side panes 6 and 7 from tilting, a slot 18 is included laterally on the affixed part 10, of the round bar sliding guide, that is fastened to the balance housing, as shown in FIG. 2. A hook on the side pane 7 projects into the slot 18. However, because the slot-like guide 18 is disposed on the affixed part 10, of the round bar sliding guide, that is fastened to the balance housing, the slot therefore is also affixed to the balance housing. The movable round bar 11 of the round bar sliding guide is not configured to guide the side panes 6 and 7. Conversely, the side panes 6, 7 do not provide a guide for the upper sliding door 8. Accordingly, the upper sliding door is not coupled to either of the side panes via frictional effects.

A section of an advantageous embodiment of a front panel is shown in FIG. 4. The front pane 5 includes outer and inner panes (for example, glass panes) 5" and 5''', respectively, that are connected to one another via an adhesive layer 20. The inner pane 5''' is somewhat smaller in width than the outer pane 5", creating a step, as illustrated in FIG. 4. The respective side pane 6 or 7 fits snugly into the step, thereby forming a labyrinth seal 21/22. In this manner, the interior of the weighing space is protected from drafts of air, even without the use of special elastic seals. For example, the front of the balance scale is particularly well shielded from the operator's breath because an outer slot 21 of the labyrinth seal lies exactly transverse to the direction of the draft of the operator's breathing. This preferred double-pane configuration permits omission of an encircling frame with seals, ensuring an open view of the goods being weighed, without affecting its function as wind guard.

Additionally, the front pane 5 can be configured as a safety glass panel, due to the adhesive layer 20 between the two panes 5" and 5''', which configuration is advantageous for certain applications. Specifically, special surface coatings, such as reflective layers for the radiation of heat, can be used in the bond between the two glass panes 5" and 5'''. Because such special surface coatings are less durable, they thus are not favorably used on the outer surfaces of the panes. However, at the inner surfaces of the two glass panes 5" and 5''', durability is not critical, and thus these sensitive layers can be used without additional measures.

The above description of the preferred embodiment has been given by way of example. From the disclosure given those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalent thereof.

What is claimed is:

1. An analytical balance comprising:
   a balance housing comprising a base area and a back structure;
   a balance scale; and
   a wind guard encircling said balance scale and comprising a base surface formed by said base area, a back wall formed by said back structure, a fixed front pane, a right and a left movable side pane, and a movable upper sliding door,
   wherein said fixed front pane is implemented without a frame and is fastened to said base area, wherein said right and left side panes are guided on said base area and are secured on said back structure to prevent tilting, and wherein said upper sliding door is guided by at least one sliding guide on said back structure of said balance housing.

2. The analytical balance according to claim 1, wherein said right and left side panes and said upper sliding door are opened and closed by hand.

3. The analytical balance according to claim 1, wherein said right and left side panes and said upper sliding door are opened and closed by motor.

4. The analytical balance according to claim 1, wherein said upper sliding door is guided by two sliding guides on said back structure of said balance housing.

5. The analytical balance according to claim 1, wherein said sliding guide comprises a sliding cover and a sliding liner, wherein said sliding liner is affixed to said balance housing and said sliding cover moves with said upper sliding door.

6. The analytical balance according to claim 1, wherein said sliding guide comprises an affixed part, wherein said affixed part is fastened to said balance housing and has a C-shaped portion in cross-section.

7. The analytical balance according to claim 6, further comprising a sliding liner, C-shaped in cross-section, wherein said sliding liner is fastened in an interior round hollow space of said affixed part.

8. The analytical balance according to claim 7, wherein said sliding liner is disposed at a front end of said affixed part.

9. The analytical balance according to claim 1, wherein said sliding guide comprises a lateral stay and a bar with a round cross-section, and wherein said round bar is connected to said upper sliding door by said lateral stay.

10. The analytical balance according to claim 9, wherein said sliding guide further comprises a sliding cover that is fastened to said round bar.

11. The analytical balance according to claim 10, wherein said sliding cover is fastened to a back end of said round bar.

12. The analytical balance according to claim 9, wherein said round bar comprises a slotted metal pipe and a plastic core, wherein said slotted metal pipe is pressed onto said plastic core.

13. The analytical balance according to claim 9, wherein said sliding guide further comprises a rack disposed on said lateral stay, and wherein said rack couples said upper sliding door to a motor.

14. The analytical balance according to claim 9, further comprising a sliding door handle positioned on said lateral stay, wherein said sliding door handle is provided for moving said upper sliding door manually.

15. The analytical balance according to claim 1, wherein said front pane comprises an outer pane and an inner pane, wherein said inner pane has a smaller width than said outer pane, wherein said inner and outer panes are joined and form lengthwise lateral steps, and wherein front edges of each of said side panes fit respectively into said lateral steps to form respective labyrinth seals.

16. The analytical balance according to claim 15, wherein said inner and outer panes are formed of glass.

17. The analytical balance according to claim 15, wherein said front pane comprises a layer disposed between said inner and outer panes.

18. The analytical balance according to claim 17, wherein said layer comprises a heat protection layer.

19. The analytical balance according to claim 1, wherein said front pane comprises an outer pane and an inner pane, wherein said inner pane has a smaller width than said outer pane, wherein said inner and outer panes are joined and form lengthwise lateral steps and a widthwise upper step, and wherein a front edge of said upper sliding door fits into said lateral steps and said widthwise upper step to form respective labyrinth seals.

20. The analytical balance according to claim 1, wherein said back structure defines an encased volume non-overlapping with and offset from said wind guard, and said back wall forms a partition wall between said wind guard and said back structure.

21. The analytical balance according to claim 1, wherein said upper sliding door comprises a transparent primary surface that extends substantially parallel to said base surface and at least one transparent shank portion that is angled with respect to said primary surface.

22. The analytical balance according to claim 21, wherein said primary surface transitions into said shank portion without interposition of an opaque member.

23. The analytical balance according to claim 21, wherein said shank portion extends substantially parallel to at least one of said side panes.

24. The analytical balance according to claim 21, wherein said upper sliding door is configured to slide along said sliding guide between a closed position over a first volume defined by said wind guard and an open position at least partly above a second volume defined by said back structure.

* * * * *